United States Patent [19]
LeMaire et al.

[11] Patent Number: 5,999,530
[45] Date of Patent: *Dec. 7, 1999

[54] METHOD AND APPARATUS FOR TRANSPARENT INTERMEDIATE SYSTEM BASED FILTERING ON A LAN OF MULTICAST PACKETS

[75] Inventors: Thomas LeMaire, Acton, Mass.; Floyd Backes, Temple, N.H.; Cyndi Jung, Menlo Park, Calif.

[73] Assignee: 3Com Corporation, Santa Clara, Calif.

[*] Notice: This patent is subject to a terminal disclaimer.

[21] Appl. No.: 08/761,574

[22] Filed: Dec. 6, 1996

Related U.S. Application Data

[63] Continuation-in-part of application No. 08/542,157, Oct. 12, 1995, Pat. No. 5,818,838.

[51] Int. Cl.$^6$ .............................. H04L 12/46; H04L 12/56
[52] U.S. Cl. ..................... 370/390; 370/401; 370/432; 370/911
[58] Field of Search .................. 370/401, 402, 370/390, 410, 432, 910, 911, 389, 360, 362, 363, 469, 400, 403, 404, 431, 486, 463, 487, 489, 490, 492, 501, 502, 449; 348/16; 395/309; 340/825.52, 825.53

[56] References Cited

U.S. PATENT DOCUMENTS

| | | | |
|---|---|---|---|
| 5,361,256 | 11/1994 | Doeringer et al. | 340/825.52 |
| 5,500,860 | 3/1996 | Perlman et al. | 370/85.13 |
| 5,517,494 | 5/1996 | Green | 370/408 |
| 5,530,703 | 6/1996 | Liu et al. | 370/85.13 |
| 5,539,737 | 7/1996 | Lo et al. | 370/401 |
| 5,570,366 | 10/1996 | Baker et al. | 370/85.13 |
| 5,608,726 | 3/1997 | Virgile | 370/401 |

OTHER PUBLICATIONS

S. Deering, "Host Extensions for IP Multicasting," IETF RFC 1112, Network Working Group (Aug. 1989).

Green, "Inside SMRP Router Specification" (1994).

*Primary Examiner*—Douglas W. Olms
*Assistant Examiner*—Seema S. Rao
*Attorney, Agent, or Firm*—Townsend and Townsend and Crew LLP; Kenneth R. Allen

[57] ABSTRACT

A bridge (62) capable of reducing unwanted WAN multicast packet traffic in a LAN and an associated method and an associated LAN is disclosed. The bridge examines the contents of WAN multicast query and report packets and WAN multicast router-to-router discovery packets and includes this information in its filtering database (88). The bridge designates ports on which query packets or MRRDPs are received as router ports. When there is no WAN router generating multicast query packets into the LAN, the bridge simulates the behavior of a WAN router and generates WAN multicast query packets so as to cause report packet generation by end systems. A timeout interval for undesignating router ports and a method for determining an appropriate timeout for a port is disclosed.

23 Claims, 4 Drawing Sheets

| ETHERNET HEADER | IP HEADER | DATA | ETHERNET TRAILER (24 BITS) |
|---|---|---|---|
| ETHERNET ADDR(48) | IP ADDR(32) | | |

FIG. 3

| LAYER NAME (NUMBER) | DEVICES | DATA | PROTOCOLS |
|---|---|---|---|
| HIGHER LAYER PROTOCOLS | | | |
| APPLICATION LAYER (5) | | FILES | FTP, HTTP |
| TRANSPORT LAYER (4) | ROUTERS | ROUTING PACKETS | TCP, UDP |
| ROUTING LAYER (3) | ROUTERS | ROUTING PACKETS | IP |
| DATA LINK LAYER (2) | BRIDGES | PACKETS | ETHERNET |
| PHYSICAL LAYER (0,1) | REPEATERS | BITS | ETHERNET |

HIGH

LOW

FIG. 4

METHOD AND APPARATUS FOR TRANSPARENT INTERMEDIATE SYSTEM BASED FILTERING ON A LAN OF MULTICAST PACKETS

This application is a continuation-in-part of Ser. No. 08/542,157 now U.S. Pat. No. 5,818,838 filed Oct. 12, 1995 which is incorporated by reference herein for all purposes.

BACKGROUND OF THE INVENTION

An extensive discussion of important background concepts was included in Ser. No. 08/542,157, now U.S. Pat. No. 5,818,838. That discussion is incorporated herein by reference and summarized below.

This invention relates to transmission of information between multiple digital devices on a network and between multiple networks on an internetwork. More particularly, this invention relates to a method and apparatus for allowing an intermediate system within a local area network (LAN) to transparently filter multicast packets from a wide area network or internetwork (WAN) directed to that LAN so that those packets are only delivered to end systems that wish to receive them.

Standards

This specification presumes some familiarity with the general concepts, protocols, and devices currently used in LAN networking applications and in WAN internetworking applications such as IEEE 802 (also ISO 8802). Among the protocols specified in IEEE 802 are IEEE 802.3, the LAN protocols commonly referred to as Ethernet. A separate set of protocols used in internetworking, i.e. connecting multiple LANs, is referred to as the TCP/IP Protocol Suite. (TCP and IP are acronyms for Transmission Control Protocol and Internet Protocol.)

An overview of concepts related to the invention is presented below. For a more detailed discussion of background information, the reader should consult the above mentioned standards documents or a number of readily available reference works including Stevens, R. W., *TCP/IP Illustrated*, Addison Wesley, 1994.

FIG. 1

FIG. 1 illustrates a local area network (LAN) 40 of a type that might be used today in a moderate sized office or academic environment and of a type in which the present invention may be effectively employed. Typical modern LANs such as 40 are comprised of one to many LAN intermediate systems (ISs) such as ISs 60–62 that are responsible for data transmission throughout the LAN and a number of end systems (ESs) such as ESs 50*a*–*d*, 51*a*–*c*, and 52*a*–*g*, that represent the end user equipment. In one type of LAN, LAN ISs 60–61 are referred to as bridges and WAN ISs 63 and 64 are referred to as routers, however many different LAN configurations are possible, and the invention is not limited in application to the network shown in FIG. 1.

The LAN shown in FIG. 1 has segments 70*a*–*e*, 71*a*–*e*, and 72*a*–*e*, and 73*a*. A segment is generally a single interconnected medium, such as a length of contiguous wire, optical fiber, or coaxial cable or a particular frequency band. A segment may connect just two devices, such as segment 70*a*, or a segment such as 72*d* may connect a number of devices using a carrier sense multiple access/collision detect (CSMA/CD) protocol or other multiple access protocol such as a token bus or token ring. A signal transmitted on a single segment, such as 72*d*, is simultaneously heard by all of the ESs and ISs connected to that segment.

Packets

In a LAN such as 40, data is generally transmitted between ESs as independent packets, with each packet containing a header having at least a destination address specifying an ultimate destination and generally also having a source address and other transmission information such as transmission priority. Transmissions within the LAN are generally source driven, i.e. the LAN will deliver a data packet from a source to the destination address specified in the packet regardless of whether that destination ES actually wants to receive the packet. Packets may contain data or may be control packets, containing control information that is used to facilitate communication within the network.

Bridges

The LAN ISs in LAN 40 include bridges 60–63. Bridges are understood in the art to be a type of computer optimized for very fast data communication between two or more segments. For example, bridge 60 is a computer having a processor, a memory for storing network information, connections to two or more separate segments, and a buffer memory for storing packets received from one segment for transmission on another segment. Bridge 60 receives packets from a source segment such as 70*f*, stores the packets, and then transmits the packets on another segment such as 70*a*, when the bridge detects that the other segment is silent. A bridge generally makes no changes to the packets it receives on one segment before transmitting them on another segment. Bridges are not necessary for operation of a LAN and in fact are generally invisible to both the ESs to which they are connected and to other bridges and routers. By invisible it is meant that a prior art bridge does not communicate any control packets to other devices at other layers in the network and facilitates communications between devices on two different segments in such a way that neither the sending device nor the receiving device is aware that the devices are not on the same segment.

Modern bridges, as described below, provide filtering functions whereby a bridge learns the LAN addresses of all ESs that may be reached through each of its ports and forwards packets only out of the port to which the destination ES of that packet is connected. Filtering bridges are enabled to quickly examine the LAN address of every received packet to determine whether and to which segment that packet must be bridged. As an example, when filtering bridge 62 receives a packet on segment 72*a* addressed to 52*b*, that packet is bridged only to segment 72*b* and not to segments 72*c* and 72*d*.

In order to accomplish this filtering function, a bridge must somehow know which ESs are attached to each segment connected to the bridge. Generally, this is done in one of two ways: a bridge may be configured by a network manager to know the LAN addresses of the ESs connected to each segment, or a bridge may be enabled to learn the LAN address of ESs connected to each segment as the bridge is receiving packets. Bridges enabled to learn which ESs are connected to each of their segments do so by examining the LAN source address of packets received on a particular port. A self-learning bridge generally stores the information it learns from examining the source address of packets in a portion of the bridge's memory referred to herein as a Bridge Filtering Table (BFT). Once a bridge has placed entries in its BFT, upon receiving a packet, the bridge will examine the LAN destination address of the buffered packet and if, according to the BFT, the destination address is on the same segment from which the packet was received then the packet has presumable already been received by the destination ES and the bridge discards the buffered packet. If the destination ES is on a different segment from the originating ES then the bridge bridges the packet by transmitting it on the destination ES's segment. If the destination address is not present in the BFT, then the bridge must bridge the packet to all other segments to insure that the proper ES receives the packet. In this way, self-learning bridges gradually learn more and more about the ESs connected to them and gradually reduce unnecessary data flow through the LAN. In a prior art bridge, construction of the BFT and subsequent filtering of packets is accomplished transparently by the bridge without the need for the ESs to be aware of the bridge or to transmit any control packets to the bridge. A prior art bridge neither transmits nor receives control packets with other devices in the LAN.

Some prior art bridges implement an algorithm known as the Spanning Tree Algorithm which allows them to ensure that a segment that is connected to more than one bridge only receives packets from one of them. This algorithm is described fully in IEEE standard 802.1d.

LAN Broadcast and Group Address Packets

In the previous discussion, it was assumed that every packet in the LAN contained a destination address indicating delivery to just one destination. This is referred to in the art as a unicast packet. It is also possible for a source in LAN 40 to transmit a packet to all the ESs in the network using a special address known as a broadcast address. A broadcast address is special destination address reserved by the LAN protocol for broadcast packets. In most LAN implementations, the broadcast address can never be a source address for a packet and therefore the broadcast address will never be entered into a BFT. Every bridge receiving a broadcast packet will attempt to find the packet's destination address in that bridge's BFT, will fail, and will therefore bridge the packet to all ports, which is exactly what is desired for a broadcast packet. As an alternative, a bridge may be pre-configured by its driver software to recognize broadcast packets and forward them to all ports.

In 802.3 Ethernet, Ethernet addresses are 48 bits. The broadcast address is defined as FFFF or all 1's. 802.3 also defines a set of Ethernet Group Addresses, indicating more than one but less than all destinations. Ethernet Group Addresses are reserved addresses that cannot be assigned to any individual ES or IS. Within a standard prior art LAN, any packet having a Ethernet Group Address is broadcast to every ES in the LAN, and it is up to the individual ESs to determine whether they want to receive the packet based on that packets Group Address.

Routers

ESs within LAN 40 can communicate with any other ES in LAN 40 either directly if the ESs are on the same physical segment or through a bridge. However, if an ES wishes to communicate with an ES or other service on a different LAN, that data must be transmitted over a WAN such as 42. FIG. 2 depicts WAN 42. WAN 42 is a network of networks, or an internetwork. (The largest and most well known internetwork is the world-wide Internet.) WANs are generally comprised of a number of larger computers that are optimized for WAN transmissions, herein referred to as routers 64 and 68a–e. A router is a generally larger computer than a bridge, but, like a bridge, it too has a processor, a memory for storing network information, and connections to two or more separate segments. Some routers, like router 64, provide WAN services to a LAN and in addition can forward WAN packets through the mesh network to facilitate WAN communication. Other routers are multi-user multipurpose computers or file-servers that include routing functions. Still other routers are computers exclusively reserved for handling WAN data traffic.

Communication of WAN packets over WAN 64 via the routers is very different from packet communication within LAN 40 and occurs under a different protocol having a different addressing scheme. Unlike bridges, routers communicate control packets with every ES to which they are attached as well as to other routers in the WAN. A router uses information it receives via control packets and possibly configuration information supplied by an operator to build a representation for itself of the network, which the router stores in a routing table. A router examines the WAN destination address of every packet it receives and uses information stored in its routing table to make an individual routing determinations about a packet based on the packet's destination address, other information in the packet's header, and the router's knowledge about the dynamic state of the WAN. Unlike a bridge, a router may make two different routing determinations for different packets with the same destination address based on the dynamic state of the WAN. A router such as 64 is generally unaware of the presence of any bridges within a LAN to which it is connected and sends all data into the LAN as though router 64 was directly connected to each ES within the LAN.

Typically, a WAN such as 42 will have a different addressing scheme and different packet structure than that used in the LAN. Every ES in LAN 40 that wishes to receive packets from WAN 42 must have assigned to it a separate WAN address. In IP, WAN addresses are 32 bits long and are generally written in a dotted decimal notation having values from 0.0.0.0 to 255.255.255.255. Router 64 learns the LAN address and the WAN address of every ES in LAN 40 and translates packets and addresses between LAN 40 and WAN 42.

FIG. 3 depicts a packet as it may be transmitted to or from router 64 on LAN segment 73a. The packet is essentially an Ethernet packet, having an Ethernet header 202 and a 48-bit Ethernet address (00:60:8C:19:AA) 204, and an Ethernet trailer 230. Within the Ethernet packet 200 is contained, or encapsulated, an IP packet, represented by IP header 212, containing a 32 bit IP address 214 (199.35.126.34). Packet 200 contains a data payload 220 which holds the data the user is interested in receiving or holds a control message used for configuring the network.

WAN Multicasting

WAN 42 may be enabled to route WAN multicast packets (WMPs) which are delivered only to those routers that request receipt of them. When running according to the TCP/IP Suite, routers and ESs communicate routing information through a special protocol referred to as the Internet Group Management Protocol (IGMP). In IP Multicast, a source that wishes to send WMPs will be assigned a special WAN multicast destination address from a list of addresses reserved for multicast. Within LAN 40, WMPs are translated by router 64 into LAN packets having a LAN destination address that is a LAN Group Address. IP Multicast includes a direct algorithmic mapping between a WAN IP Multicast Address and a LAN Group Address. According to IGMP, a router such as 64 periodically queries ESs connected to it to report back to the router if they wish to receive any WMP streams. This query is broadcast within LAN 40 to one of the reserved Ethernet Group Addresses. An ES that wants to receive a WMP stream will respond to this IGMP Query by transmitting an IGMP Report to the group address of which it wishes to be a member. This report is heard and registered by router 64. The IGMP report is addressed to a LAN address that corresponds to the WMP address that the ES wishes to receive. An ES sends a separate report for each WMP stream it wishes to receive. In the art, it is sometimes said that the ES joins a multicast group each time it indicates to the router that it wishes to receive a particular WMP stream. The router compiles the IGMP reports it receives from one or more ESs and then the router sends a request to other routers in WAN 42 requesting delivery of particular WMP streams.

Three details of IGMP are important for the following discussion. One is that an ES may leave a multicast group at any time without informing the router. The ES simply does not respond the next time that the router sends an IGMP Query on the LAN. (Newer versions of IGMP allow an ES to send a packet telling the router that they no longer wish to receive a particular WMP stream, but these newer versions do not require ESs to do so.) A second important detail of IGMP is that in the case where a LAN such as 40 contains two routers with connections to the same WAN, the IGMP protocol includes a mechanism for preventing both routers from transmitting Query packets to the LAN. According to IGMP, when a router receives a Query packet on any of its LAN ports, it examines the WAN source address of that packet and if the source address is lower than the router's own WAN address, the router suppresses transmitting Query packets. Thus, eventually, only one router (in one embodiment the one with the lowest IP address) will transmit Query packets on any given LAN.

A final important detail of IGMP is that ESs read IGMP Reports addressed to groups to which they belong. According to IGMP, an ES does not send an IGMP Report for a WMP address if the ES detects that another ES on its segment has already requested that WMP address. The second ES will simply receive the WMPs as they are being transmitted to the first ES to request them. What this means is that under IGMP, a router never knows whether only one or more than one ESs on the LAN to which it is connected actually wishes to receive a particular WMP stream. The router therefore cannot direct WMPs to a particular ES LAN destination address, but must direct the WMP to one of the reserved LAN Group Addresses.

The TCP/IP protocol suite also supports a number of WAN multicast routing protocols which routers use to communicate routing information. IGMP is used to communicate between ESs and routers, but other protocols are needed to communicate multicast information between routers. To date, the most widely deployed multicast routing protocols are Distance Vector Multicast Routing Protocol (DVMRP), Multicast Open Shortest Path First (MOSPF), and Protocol Independent Multicast (PIM). A given WAN multicast router may employ one or more of these multicast routing protocols to communicate with neighboring routers.

Regardless of which router-to-router multicast protocol is used in a given LAN, all router-to-router protocols are characterized by the fact that they define certain packets which are never inhibited that multicast routers use to discover one another. These packets will be referred to herein as Multicast Router-to-Router Discovery Packets (MRRDPs). Generally, MRRDPs are addressed to LAN multicast destination addresses which are reserved for control packets—those where the low order 24 bits lie between hexadecimal 00:00:00 and 00:00:FF. DVMRP packets are a type of IGMP packet, but since they are addressed to a multicast address which is reserved for routers, ESs ignore them. Older versions of the PIM protocol have packets which are also a type of IGMP packet, but newer versions of PIM may have packets which are their own IP protocol type. MOSPF packets are a variant of OSPF packets which have multicast information embedded within them.

ESs generally ignore MRRDPs. Prior art ISs handle MRRDPs no differently than other multicast packets.

An important difference between MRRDPs and IGMP Query packets is that, whereas a router receiving an IGMP Query packet will suppress it's own IGMP Query packets if the WAN source address of the received packet is lower than its own WAN address, for the most part, routers never suppress MRRDP packets even when they detect another router sending MRRDP packets on their connected network.

Wan Multicast Packets in a LAN

As described above, within LAN 40, Group Address packets are delivered via the bridges to every segment in the LAN. Therefore, even if just ES 72b in LAN 40 requests a particular WMP stream, that stream will be converted to a LAN Group Address and be delivered to every ES in LAN 40. In the case of a heavy WMP stream such as a video link, this can result in a huge amount of unwanted traffic on various LAN segments.

One prior art solution to this problem would be to reconstruct LAN 40 and replace each of the bridges 60–63 with computers that function more as routers. These "routers" would then be able to participate in the overall IGMP protocol and direct WMP packets only to those segments where they were wanted. This is an expensive proposition, however, increasing the cost of the LAN hardware infrastructure, LAN management, and likely decreasing the overall speed of the LAN.

Layers

A final background concept important to understanding the present invention is the concept of layered network protocols. Modern communication standards, such as the TCP/IP Suite and the IEEE 802 standards, organize the tasks necessary for data communication into layers. At different layers, data is viewed and organized differently, different protocols are followed, and different physical devices handle the data traffic. FIG. 4 illustrates one example of a layered network standard having a number of layers, which we will refer to herein as: the Physical Layer, the Data Link Layer, the Routing Layer, the Transport Layer and the Application Layer. These layers correspond roughly to the layers as defined within the TCP/IP Suite. (The 802 standard has a different organizational structure for the layers and uses somewhat different names.)

An important ideal in layered standards is the ideal of layer independence. A layered protocol suite specifies standard interfaces between layers such that, in theory, a device and protocol operating at one layer can co-exist with any number of different protocols operating at higher or lower layers, so long as the standard interfaces between layers are followed.

To tie the concept of layers back to the preceding discussion, it may be seen that in LAN 40, WAN transmissions take place at the Routing Layer while LAN transmissions take place at the lower Data Link Layer. At the Routing Layer, ESs communicate control packets to the routers to which they are attached. However, at the Data Link Layer, ESs communicate no control packets with bridges and therefore ESs cannot participate in a multicast protocol at the Data Link Layer.

From the preceding it will be seen that what is needed is a LAN capable of correctly accepting and delivering WAN multicast packets to end systems that desire to receive them, but that does not experience the heavy amounts of undesired traffic generated in prior art LANs.

For purposes of clarity, the present discussion refers to network devices and concepts in terms of specific examples, namely Ethernet and TCP/IP. However, the method and apparatus of the present invention may operate with a wide variety of types of network devices including networks dramatically different from the specific examples illustrated in FIG. 1 and described below. In particular, the present invention would have application within a set of proprietary WAN and LAN standards has been developed by Apple Computer Corporations and is referred to as Applelink and SMRP. It is therefore not intended that the invention be limited except as done so in the attached claims.

SUMMARY OF THE INVENTION

According to the present invention, an improved LAN and LAN bridges are capable of receiving WMPs and delivering those WMPs only on segments having at least one router, or at least one ES that wishes to receive the WMPs. The invention accomplishes this by modifying layer 2 intermediate systems within the LAN to listen to layer 3 routing control packets and to make filtering decisions based on information in the layer 3 packets. The invention includes a mechanism for a layer 2 intermediate system to generate layer 3 IGMP Query Packets when no higher level system is generating such packets in the LAN. The invention represents a substantial improvement over many types of prior art LANs where WAN MPs are forwarded to every segment in the LAN. In general, no modification is required in the protocols or hardware of the ESs or the WAN.

A bridge according to the present invention accomplishes these advantages by monitoring all Routing Layer Multicast data and MRRDPs and making forwarding decisions for multicast packets thereby. The bridge uses this information to augment its filtering database, thereby allowing for fast filtering of unwanted WMPs. The bridge includes improved instructions to preform the functions herein described and may include hardware modifications allowing for fast examination of layer 3 information in MRRDP.

In a prior co-assigned application, a bridge attempted to identify ports which were connected to multicast routers by examining the IGMP Query packets it received. This is not the most refined solution, however, because multicast routers may suppress generating IGMP Query packets when another lower address router is present in the network. The current invention, therefore, looks at IGMP Query packets and also examines all MRRDPs to determine which ports are connected to multicast routers.

BRIEF DESCRIPTION OF THE DRAWINGS

FIG. 3 is a diagram of an IP packet encapsulated in an Ethernet packet;

FIG. 4 is a diagram showing a layered network protocol;

DETAILED DESCRIPTION OF PREFERRED EMBODIMENTS

The following detailed discussion will describe the function of an improved bridge according to the invention in terms of a two protocol suites that have previously been discussed, 802.3 and TCP/IP. It will be understood to those of skill in the art that the invention also has application in other protocol suites employing an analogous multicast protocol.

Figure 5:
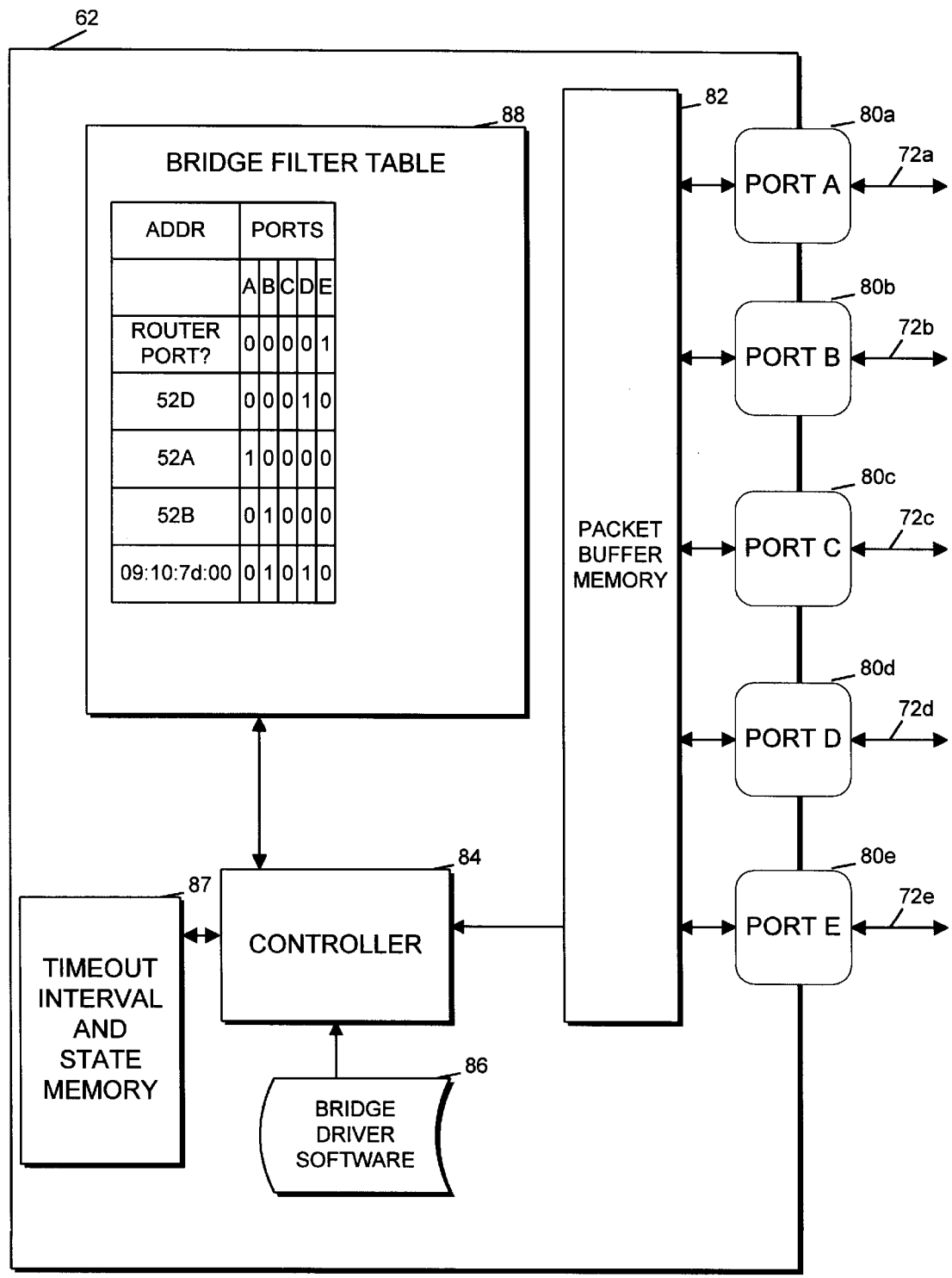
FIG. 5 is a block circuit diagram of an improved bridge according to the invention.

FIG. 5 is a block diagram of a bridge 62 with improvements according to an embodiment of the invention. The bridge has five ports 80a–e which provide circuitry and connections that enable the bridge to communicate on each segment 72a–e. Packets received over any port are stored in Shared Packet Buffer Memory 82. Controller 84 reads each received packet and processes that packet based on the instructions specified in driver 86. Controller 84 includes connections (not shown) to each other bridge component for sending and receiving control signals.

Learning Unicast Addresses in a Prior Art Learning Bridge

As is known in prior art bridges, controller 84 maintains a Bridge Filtering Table (BFT) 88 in an area of memory separate from the packet buffer. As is known in the prior art, BFT 88 contains entries for each ES LAN address from which a packet is received. Each entry specifies the LAN address from which a packet is received and includes a means for indicating a port to which that address is connected. According to a default operation mode, bridge 62 gradually learns about ESs to which it is connected by reading the LAN source addresses of packets received on its ports. Once a bridge has identified a particularly ES LAN address and stored an identifier for the port to which that ES is connected in BFT 88, packets received at bridge 62 addressed to that LAN address are bridged only to the port to which the ES is connected. In this way, bridge 62 gradually reduces unnecessary traffic on the network.

High Level Description of the Invention

According to the invention, bridge 62 is additionally enabled to filter multicast packets based on their LAN group address as follows. The invention monitors IGMP packets and MRRDPs to produce an internal database which associates a set of output ports with each LAN multicast address which has appeared in an IGMP packet.

In addition, the invention designates certain ports as Router Ports. In LANs which contain active multicast routers, ports on which MRRDPs are received are designated as Router Ports. In LANs which contain no multicast routers, the most recent port on which an IGMP Query packet is received is designated the Router Port.

When WAN multicast data packets (WMPs) arrive which are not MRRDPs, the invention filters the packets as follows: the packet is forwarded to all ports associated with the LAN multicast address in the internal database, as well as to all Router Ports. MRRDPs are forwarded out all ports. IGMP Report packets are forwarded out only the Router Ports.

Designating Router Ports

According to the invention, bridge 62 designates each one of its ports as either a Router Port or a non-Router port. Generally, a port is designated a Router port if the port attaches to a portion of the LAN which contains a multicast router. In FIG. 5, port 80e would be designated a Router Port, due to the presence of router 64 on the portion of the LAN attached to segment 72e. In cases where no active multicast routers are attached to any ports, the port on which the most recent IGMP Query packet was received is designated as the Router Port. Finally, in cases where Bridge 62 is itself the bridge in the LAN which is emitting the IGMP Queries for the LAN, there are no Router Ports designated on the bridge.

According to a specific embodiment of the invention, the presence of a multicast router in a portion of the LAN attached to a port is inferred by the examination of MRRDPs as follows. WAN multicast routers running the DVMRP protocol are inferred when DVMRP PROBE (IGMP code 1) or DVMRP ROUTE REPORT (IGMP code 2) packets are received on the port. Other DVMRP packets are ignored. WAN multicast routers running the PIM protocol are inferred when PIM Query messages are received on the port. WAN multicast routers running the MOSPF protocol are detected when OSPF HELLO or Database Description packets are received whose options fields have the multicast capability (MC) bit set.

Timing Out Router Port Designations

Once a port has been designated a Router Port, bridge 62 will maintain that designation until bridge 62 fails to see a multicast routing protocol packet or IGMP Query Packet on that port within a specified time-out. After a time-out elapses, the port reverts back to a non-Router Port designation.

Initiating IGMP Packets

On power up or system reset or when none of its ports are designated as Router Ports, an improved bridge 62 according to the invention, transmits IGMP Query packets at regular intervals out of each of its ports A–E. Initially, each of these ports are designated by bridge 62 as non-Router Ports. Bridge 62 transmits IGMP Queries with a WAN source address which is assigned to it according to the invention. Standard prior art bridges do not have a WAN source address because they do not communicate at layer 3. In response to IGMP Queries, ESs attached to bridge 62 that wish to receive WMPs will transmit IGMP Reports on their segments. These reports will be received at bridge 62. These Reports have a destination address equal to the multicast address from which the ESs wish to receive packets and the source address of the ES sending the Report. Each time bridge 62 hears a Report on one of its ports, it stores an identifier for the port and the LAN Group address in BFT 88 indexed according to that LAN Group Address and indicating on which port the Report Packet was received by placing a flag value in an appropriate location (in the example in FIG. 5, bridge 62 places a "1" in a column designating ports B and D wish to receive WMP packets addressed to Ethernet Group address 09:10:7D:00).

Similarly to as is known in prior art routers, whenever bridge 62 receives an IGMP Query Packet on one of its ports, it examines the WAN Source Address of the Query. If the WAN source address of the received Query Packet is greater than bridge 62's WMP source address, bridge 62 continues sending out its own Query Packets at a periodic interval. If the WAN source address of the received Query Packet is less than bridge 62's WMP source address, bridge 62 suppresses its own Query Packets. If no MRRDPs have been received within the time-out interval, it also marks the port on which the Query Packet was received as a Router Port.

MRRDP Packets

Whenever bridge 62 receives a multicast routing packet (DVMRP, PIM, or MOSPF) on any one of its ports, it does three things. First, it stops sending out its own IGMP Query Packets regardless of the WAN Source Address in the MRRDP packet, so that the operation of the invention will be as transparent as possible to prior art bridges and routers in the LAN. Second, if any port was previously designated as a Router Port due to receipt of an IGMP Query packet, that port is designated as a non-Router port. Third, the port on which the multicast routing protocol packet was received is designated as a Router Port. Note it is possible for multiple ports to be Router Ports if all are receiving MRRDPs, but only one port can be a Router Port due to receipt of IGMP queries, and only if no MRRDPs have been received within a specified time-out interval.

Updating the BFT

Whenever ports are updated from Router to non-Router status or from non-Router status to Router status, bridge 62 updates a special entry in BFT 88 which indicates which ports are router ports. In the example in FIG. 5, in the BFT entry for Router Ports, bridge 62 places a "1" in column E designating port E is a Router Port.

Forwarding Multicast Packets

According to the invention, multicast packets are classified into three types, each type with different forwarding rules. The first packet type is multicast packets with LAN destination addresses where the low order 24 bits are between 00:00:00 and 00:00:FF. These packets are considered to be MRRDPs; they are assumed to be relatively low frequency and are not filtered. These packets are forwarded to all ports. IGMP report packets are referred to as Type 2, and all other WMPs, assumed to be data WMPs, are referred to as Type 3.

According to the invention, bridge 62 forwards report packets (Type 2) only out of Router Ports in order to prevent ESs on other ports from suppressing their IGMP Report packets. According to the invention, bridge 62 needs to receive a Report packet from each of its segments where an ES has joined the group, so that it can identify the segments to which it must bridge WMPs.

Type 3 packets, data WMPs, are forwarded according to the contents of BFT 88 as follows. Bridge 62 looks up the LAN destination address of the WMP in BFT 88 and forwards those packets out of all the ports specified in that entry in BFT 88, and also out of all ports specified in the special Router Ports entry in BFT 88. Therefore the invention never filters any WMPs on Router ports. This is necessary so that the operation of the invention will not be visible to prior art multicast routers, and to ensure proper operation in a LAN with multiple switched segments, as described below.

Note that forwarding WMPs on Router Ports takes care of ESs such as 53a which are attached to a segment such as 72e. An IGMP Report from ES 53a might be inhibited by the forwarding of an IGMP Report by bridge 62 onto its Router Port. But since data WMPs are always forwarded on the Router Port, it is not necessary that bridge 62 see the IGMP Report from ES 53a, the data WMPs are forwarded on that segment anyway.

Example of Operation of the Invention With a Router in the LAN

Figure 1:
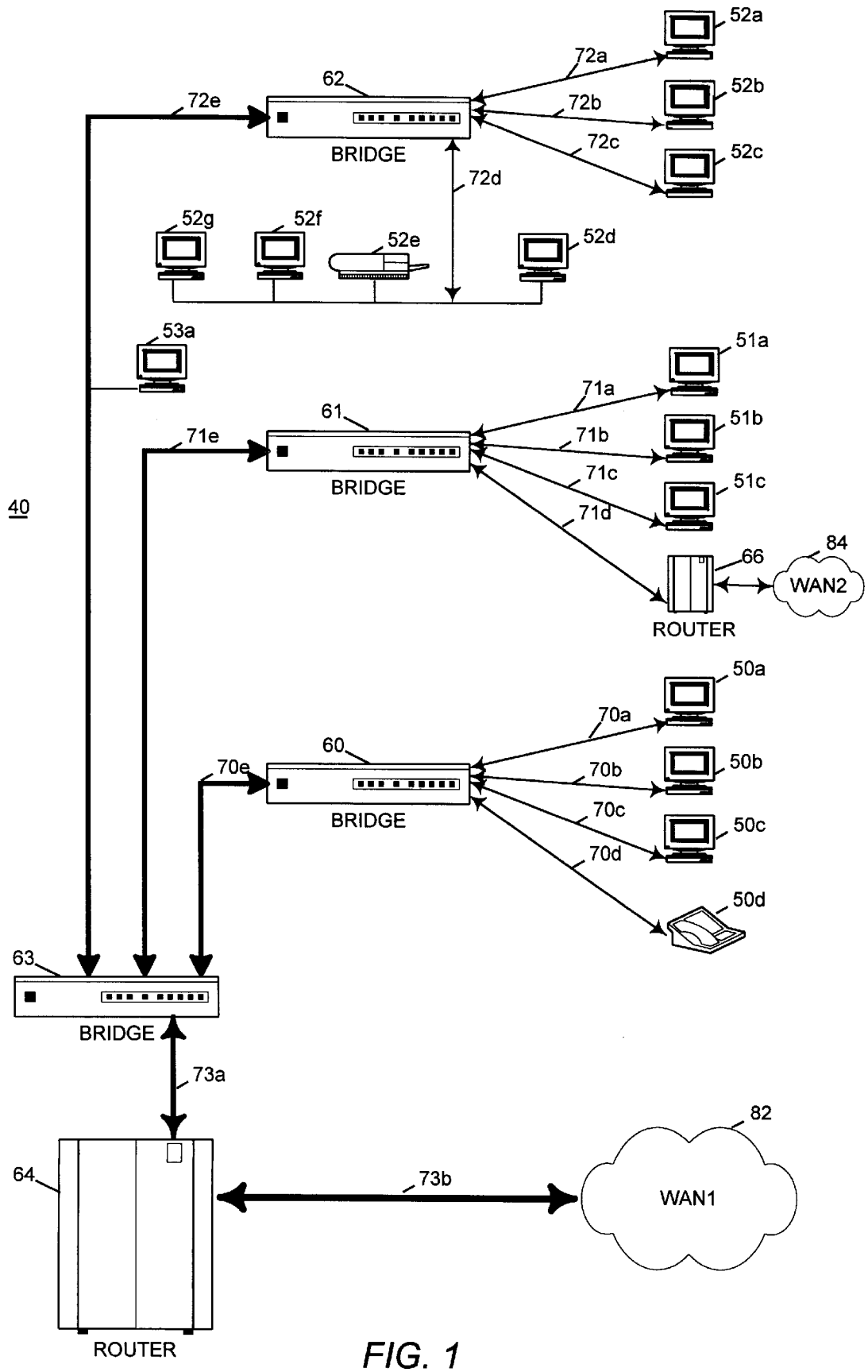
FIG. 1 is a diagram of a local area network of one type in which the invention may be effectively employed.
Figure 2:
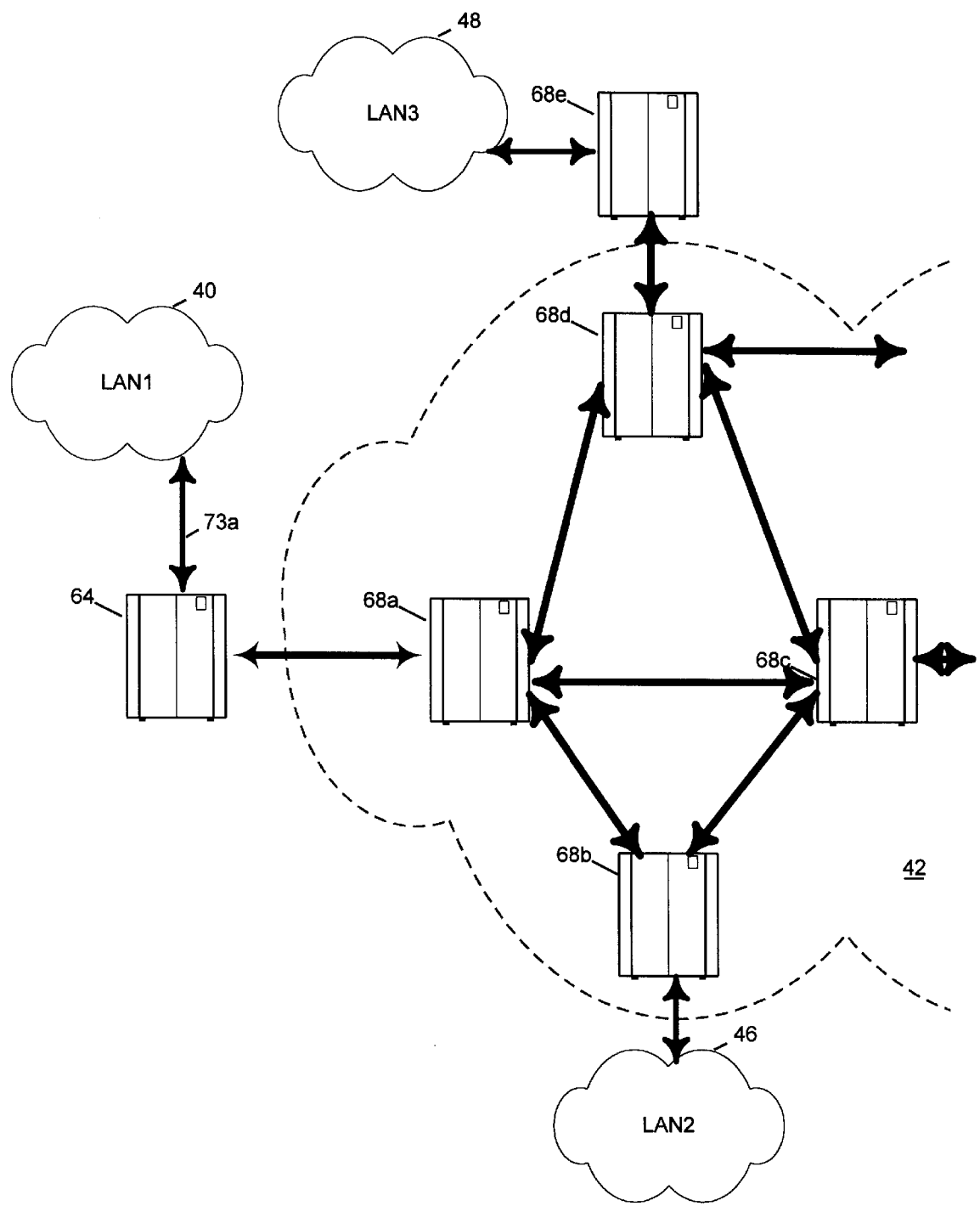
FIG. 2 is a diagram of a wide area network of one type in which the invention may be effectively employed.

Consider the case in FIG. 1 where both ES 52a and 51a are sending IGMP Reports for a LAN multicast group to their respective directly attached bridges 62 and 61. The operation of the invention requires that bridge 63 forward the data WMPs on segments 72e and 71e, but not on segment 70e.

If router 64 is running a multicast routing protocol, bridge 63 must also forward data WMPs on segment 73a. The rules above provide for this behavior. In the case where router 64 is running a routing protocol, this works as follows: the IGMP Report from 52a will be forwarded by bridge 62 onto segment 72e since MRRDPs emitted by router 64 have been received on segment 72e, and therefore port 80e has been designated a Router Port on bridge 62. The analogous process has operated on bridge 61. On bridge 63, the BFT for that LAN multicast address indicates that segments 72e and 71e are to receive WMPs for that destination address. In addition, segment 73a has been designated as a Router Segment (i.e. attached to a Router Port).

When data WMPs are emitted from ES 52a, they are forwarded onto segment 72e and received by bridge 63. Bridge 63 forwards the data WMPs onto segment 71e since IGMP Report packets were received for that WAN multicast address on that segment (because bridge 61 has designated segment 71e as a Router Segment).

Bridge 61 forwards those frames to segment 71a to ES 51a since IGMP Report packets were received on segment 71a. Finally, bridge 63 forwards the data WMPs onto segment 73a since that is a Router Segment towards router 64. This shows how the invention works correctly in a LAN where there are multiple segments linking bridges which incorporate the invention.

Example of Operation of the Invention Without a Router in the LAN

In the case where router 64 is not running a routing protocol, the invention operates correctly regardless of which WAN source address is assigned to which of the three bridges 61, 62, or 63. If bridge 63 has the lowest numbered WAN source address, bridges 61 and 62 have the same Router Ports as in the prior example and the same forwarding paths operate. If bridge 61 has the lowest number IP address, then it will emit the IGMP Queries for the LAN. Bridge 62 operates as in the prior example since segment 72e is still a Router Segment. Bridge 63 forwards packets onto segment 71e since it is a Router Segment relative to bridge 63. IGMP Reports are always forwarded to Bridge 61, and therefore data WMPs from ES 51a still are forwarded to bridge 63 and thence to bridge 62. In summary, if no router is emitting MRRDPs in the LAN, the lowest numbered bridge takes over the role of emitting IGMP Queries, the IGMP Queries take the place of the MRRDPs, and data WMPs are forwarded only onto Router Segments and to non-Router Segments only when the attached ESs have emitted the corresponding IGMP Report packets.

Further Embodiments Relating to Startup Operation

According to a further embodiment of the invention, bridge 62 handles the startup phase of operation more gracefully. One problem with the startup phase is that until MRRDPs and IGMP Queries have been received, not all ports which should be designated Router Ports are designated correctly. Also, until IGMP Report packets have been received, the contents of the BFT is not complete.

The enhancement modifies the invention during two initially coincident startup phases of operation as follows: the first startup phase is called the router discovery phase, and the second startup phase is called the group membership discovery phase.

During the router discovery phase, the invention will not issue IGMP Query packets of its own. It will track ports on which IGMP Query packets and MRRDPs are received and designate those ports as Router Ports in the BFT, as described in the invention.

The router discovery phase ends when a time-out interval has expired during which it is expected to have received MRRDPs from all multicast routers on the LAN. The time-out interval is the maximum of the periodic rates at which the DVMRP PROBE, PIM QUERY, and MOSPF HELLO or other MRRDP packets are typically issued by multicast routers onto the LAN.

The group membership discovery phase continues after the router discovery phase ends. If no MRRDPs have been received during router discovery phase, the bridge issues an IGMP Query message on all ports and the group membership discovery phase ends in approximately 10 additional seconds—long enough to be sure that all subsequent IGMP Report packets have been received. If MRRDPs have been received during the router discovery phase, the second startup phase lasts for 3 minutes, or until an IGMP Query packet has been received and 10 additional seconds have elapsed—long enough to be sure that an IGMP Query message should have been received from one of the multicast routers on the LAN, and that the subsequent IGMP Report packets have also been received.

During both startup phases, forwarding of type 3 packets (data WMPs) is done to all ports on the bridge, regardless of the state of the BFT. This ensures that no incorrect filtering takes place on the bridge. During both startup phases, type 2 packets (IGMP Report packets) are forwarded as described in the invention above.

Further Embodiments Relating to the BFT

The invention may therefore be embodied entirely within a layer 2 bridge operating as would be expected and performing all filtering functions using layer 2 addresses. One modification required of the layer 2 bridge would be a mechanism to allow the bridge to examine the layer 3 header contents of packets in order to identify certain MRRDP packets and to identify WAN multicast report packets generated by ESs.

The invention also may be embodied in a modified bridge that is enabled to examine and filter packets based on layer 3 addresses of packets. In such a modified bridge, the BFT or parts of the BFT may be indexed based on layer 3 addresses.

According to a further embodiment of the invention, bridge 62 indexes entries in the BFT not by the LAN multicast destination address, but by the WAN multicast source and destination address pair. In this embodiment, when a data WMP is received, the bridge looks up the correct entry in the BFT using the WAN addresses in the packet. This enhancement allows for WMPs to be filtered differently based on their source addresses, and thereby exploit Source-Specific Pruning features of future revisions of the IGMP protocol and future revisions of multicast routing protocols.

Conclusion

One advantage of the present invention is that it may be implemented in a LAN such as 40 while requiring no new software in the ESs and no new protocol between the ESs and the routers or between the ESs and the bridges. The present invention may be implemented by modifying some or all of the bridges in a LAN and making no other modifications to the LAN or WAN.

Another advantage of the present invention is that its operation is automatic. It requires no manual configuration by human operators—it configures itself automatically to whatever network topology it is placed into. It operates equally well in a LAN with multicast routers, as well as in LANs where no multicast routers are present or active. In particular, the automatic discovery of multicast routers is an advantage over schemes that require manual configuration of Router Ports and Router Segments.

The invention has now been explained with reference to specific embodiments. Other embodiments will be apparent to those of skill in the art. In particular, method steps have been grouped and labeled as being part of various sub-methods in order to increase clarity of the disclosure, however, these steps could be differently grouped without changing the essential operation of the invention. It is therefore not intended that this invention be limited, except as indicated by the appended claims.

What is claimed is:

1. A method in a LAN intermediate system (IS) for reducing transmission of undesired WAN multicast packets, wherein said LAN comprises a plurality of end systems, packets having an address, and a plurality of LAN intermediate systems capable of transparently forwarding or filtering packets, said ISs having a plurality of ports for connecting to network segments, comprising:

designating any port on which a multicast router-to-router discovery packet (MRRDP) is received as a router port;

receiving requests from said end systems to receive WAN multicast packets;

storing identifiers for ports on which said requests are received along with multicast addresses specified in said requests;

forwarding said requests out of only those ports designated as router ports;

examining every WAN multicast data packet received to determine the packet's multicast destination address;

forwarding said WAN multicast data packets out of only those ports on which either a request for said multicast packet's destination address was received or those ports designated as router ports; and if no multicast router-to-router discovery packet (MRRDP) is received, designating a port upon which a multicast query is received as a router port.

2. The method according to claim 1 further comprising:

if no MRRDP is received, designating a port upon which a most recent multicast query is received as a router port.

3. The method according to claim 1 further comprising:

generating at an IS a WAN multicast query packet when no multicast router-to-router discovery packet (MRRDP) are received on any ports and forwarding said WAN multicast query packets out of all ports on said IS.

4. The method according to claim 3 further comprising:

examining at said IS the source address of WAN multicast queries received on one of said IS's ports;

comparing said received source address to said IS's source address; and based on said comparing either suppressing or else continuing to generate at said IS WAN multicast queries.

5. The method according to claim 4 wherein said comparing compares WAN source addresses.

6. The method according to claim 4 wherein said comparing compares a received WAN source address to a WAN source address assigned to said IS.

7. The method according to claim 3 wherein reception of an MRRDP causes ports designated as router ports based on receipt of a query packet to become designated non-router ports.

8. The method according to claim 3 wherein reception of an MRRDP causes the IS to cease generating any query packets until a timer elapses.

9. The method according to claim 1 wherein there is specified a plurality of time out intervals wherein if a query packet or MRRDP is not received at a port designated a router port during a designated timeout interval the port is redesignated as a non-router port.

10. The method according to claim 1 wherein said LAN ISs are devices that generally forward LAN unicast packets without examining the WAN addresses of said packets.

11. The method according to claim 1 wherein said LAN ISs are modified to be able to quickly examine WAN routing information in said packets.

12. The method according to claim 1 wherein said LAN ISs forward packets transparently to said end systems without modifying the contents or header of said packets.

13. The method according to claim 1 wherein said end systems communicate with a plurality of routers using protocols in a TCP/IP protocol suite.

14. The method according to claim 1 wherein at least one of said LAN ISs meet specifications set forth in IEEE 802.1d.

15. The method according to claim 1 wherein a plurality of said end systems and said ISs communicate using an Ethernet protocol.

16. A method in a LAN intermediate system (IS) for reducing transmission of undesired WAN multicast packets, wherein said LAN comprises a plurality of end systems, packets having an address, and a plurality of LAN intermediate systems capable of transparently forwarding or filtering packets, said ISs having a plurality of ports for connecting to network segments, comprising:

designating any port on which a multicast router-to-router discovery packet (MRRDP) is received as a router port;

receiving requests from said end systems to receive WAN multicast packets;

storing identifiers for ports on which said requests are received along with multicast addresses specified in said requests;

forwarding said requests out of only those ports designated as router ports;

examining every WAN multicast data packet received to determine the packet's multicast destination address;

forwarding said WAN multicast data packets out of only those ports on which either a request for said multicast packet's destination address was received or those ports designated as router ports;

specifying a plurality of time out intervals wherein if a query packet or MRRDP is not received at a port designated a router port during a designated timeout interval the port is redesignated as a non-router port;

sampling at a router port the frequency with which query packets or MRRDPs are received; and setting said time out intervals for different types of packets to be several times the sampled frequency.

17. A method in a LAN intermediate system (IS) for reducing transmission of undesired WAN multicast packets, wherein said LAN comprises a plurality of end systems, packets having an address, and a plurality of LAN intermediate systems capable of transparently forwarding or filtering packets, said ISs having a plurality of ports for connecting to network segments, comprising:

designating any port on which a multicast router-to-router discovery packet (MRRDP) is received as a router port;

receiving requests from said end systems to receive WAN multicast packets;

storing identifiers for ports on which said requests are received along with multicast addresses specified in said requests;

forwarding said requests out of only those ports designated as router ports;

examining every WAN multicast data packet received to determine the packet's multicast destination address; and forwarding said WAN multicast data packets out of only those ports on which either a request for said multicast packet's destination address was received or those ports designated as router ports; wherein said WAN multicast queries and said WAN multicast packets are encapsulated into LAN group packets, said LAN group packets having a LAN multicast address which is algorithmically translatable with said WAN multicast address and wherein said IS detects, stores, and examines said LAN multicast addresses.

18. A local area network comprising;

a plurality of end systems, each with a connection to a network segment wherein said end systems are capable of transmitting on said segment a multicast report packet, said multicast report packet comprising a requested multicast address from which said end system wishes to receive data; and a plurality of bridges, each bridge having connections to at least two network segments, at least one of said bridges capable of detecting multicast report packets transmitted on said network segments and capable of storing an identifier of said requested multicast address along with an identifier of said segment, said at least one bridge forwarding received multicast packets only to those segments on which a multicast report packet requesting those multicast packets was received wherein said bridges are further capable of determining a frequency of received query packets on a router port and setting a timeout interval to be several times said frequency and wherein said bridges will designate a router port a non-router port when a query packet is not received during a timeout interval.

19. The local area network according to claim 18 wherein said bridges are further capable of detecting multicast query packets received on a port and designating that port a router port.

20. A method for reducing transmission of undesired layer 3 WAN multicast packets within a LAN, wherein said LAN comprises a plurality of end systems capable of transmitting and receiving layer 2 LAN packets, said packets having at least a LAN source address and a LAN destination address, and a plurality of layer 2 LAN intermediate systems (ISs) capable of transparently forwarding packets at layer 2, said ISs having a plurality of ports for connecting to network segments, comprising:

detecting at at least one of said ISs, encapsulated layer 3 WAN multicast queries to said end systems and MRRDPs by examining the contents of all layer 2 group packets and recording at said IS an identifier for each port on which said WAN multicast queries or MRRDPs are received designating those ports as router ports;

receiving at said IS layer 3 requests from said end systems to receive WAN multicast packets, said request being directed by said end system to a destination address other than the destination address of said IS and examining the layer 3 contents of said requests;

storing at said IS in a layer 2 filtering table, identifiers for ports on which said requests are received along with the layer 2 group address specified in said requests;

forwarding said requests out of only those ports on said IS designated as router ports; and filtering at said IS every LAN group addressed data packet based on said layer 2 filtering table and thereby forwarding said WAN multicast data packets out of only those ports on which either a request for said multicast packet's destination address or a query was received; and generating at an IS a layer 3 WAN multicast query packet when no ports connected to said IS are designated as router ports and forwarding said WAN multicast query packets out of all ports on said IS.

21. The method according to claim 20 further comprising:

examining at said IS the source address of WAN multicast queries received on one of said IS's ports;

comparing said received source address to said IS's source address; and based on said comparing either designating said port a router port or else continuing to generate at said IS WAN multicast queries.

22. The method according to claim 20 wherein said end systems communicate with a plurality of routers connecting said LAN to a WAN using a layer 3 protocol, said routers and said end systems exchanging control information, said control information including said WAN multicast queries and said requests.

23. A method in a LAN intermediate system (IS) for reducing transmission of undesired WAN multicast packets, wherein said LAN comprises a plurality of end systems, packets having an address and a plurality of LAN intermediate systems capable of transparently forwarding or filtering packets said ISs having a plurality of ports for connecting to network segments comprising:

designating any port on which a multicast router-to-router discovery packet (MRRDP) is received as a router port;

receiving requests from said end systems to receive WAN multicast packets;

storing identifiers for ports on which said requests are received along with multicast addresses specified in said requests;

forwarding said requests out of only those ports designated as router ports;

examining every WAN multicast data packet received to determine the packet's multicast destination address; and forwarding said WAN multicast data packets out of only those ports on which either a request for said multicast packet's destination address was received or those ports designated as router ports;

wherein said IS upon startup enters two phases of startup operation, a multicast router discovery phase and a group discovery phase.

* * * * *